(12) United States Patent
Brucker et al.

(10) Patent No.: US 8,102,316 B1
(45) Date of Patent: Jan. 24, 2012

(54) SYSTEM AND METHOD FOR TRACKING LOST SUBJECTS

(76) Inventors: Barry Brucker, Beverly Hills, CA (US); Nadeepuram K. Ranganathan, Irvine, CA (US)

( * ) Notice: Subject to any disclaimer, the term of this patent is extended or adjusted under 35 U.S.C. 154(b) by 308 days.

(21) Appl. No.: 12/541,379

(22) Filed: Aug. 14, 2009

Related U.S. Application Data

(60) Provisional application No. 61/088,948, filed on Aug. 14, 2008.

(51) Int. Cl.
*G01S 3/02* (2006.01)
*G01S 19/00* (2006.01)

(52) U.S. Cl. ................ 342/458; 342/357.2; 342/450

(58) Field of Classification Search .......... 342/450, 342/451, 458, 357.2, 357.21, 357.71; 701/213, 701/215
See application file for complete search history.

(56) References Cited

U.S. PATENT DOCUMENTS

| | | | |
|---|---|---|---|
| 5,914,675 A | 6/1999 | Tognazzini | |
| 6,014,080 A | 1/2000 | Layson, Jr. | |
| 6,339,397 B1 | 1/2002 | Baker | |
| 6,819,258 B1 | 11/2004 | Brown | |
| 2005/0017900 A1 | 1/2005 | Grimm | |
| 2005/0020274 A1 | 1/2005 | Ursini | |
| 2006/0170588 A1 | 8/2006 | Chang | |
| 2006/0176216 A1 | 8/2006 | Hipskind | |
| 2006/0223518 A1 | 10/2006 | Haney | |
| 2007/0099626 A1 | 5/2007 | Lawrence et al. | |

*Primary Examiner* — Dao Phan
(74) *Attorney, Agent, or Firm* — Mind Law Firm; Jeromye V. Sartain; Justin G. Sanders

(57) ABSTRACT

A method for monitoring and tracking the position of a subject comprises, in an exemplary embodiment, the steps of embedding a transponder into an article to be worn by the subject and installing software in a GPS-enabled receiver, such as a cell phone or the like, for synchronizing and communicating with the transponder. The receiver is to be maintained by a user, such as a guardian or the like, and stores a unique transponder code, allowing the receiver to synchronize with the transponder. The receiver may remotely activate the transponder manually or automatically, at which point the receiver triangulates the geographic position of the transponder and determines distance and direction of the transponder from the receiver in order to guide the user in the direction of the transponder. In further embodiments, the receiver communicates the subject's information and tracking code to other subscribing receivers to increase the number of searchers.

16 Claims, 1 Drawing Sheet

SYSTEM AND METHOD FOR TRACKING LOST SUBJECTS

RELATED APPLICATIONS

This application claims priority and is entitled to the filing date of U.S. Provisional application Ser. No. 61/088,948 filed Aug. 14, 2008, and entitled "System and Method for Tracking Lost Persons." The contents of the aforementioned application are incorporated by reference herein.

INCORPORATION BY REFERENCE

Applicant(s) hereby incorporate herein by reference any and all U.S. patents and U.S. patent applications cited or referred to in this application.

BACKGROUND OF THE INVENTION

1. Field of the Invention

Aspects of this invention relate generally to tracking systems and related methodologies, and more particularly to a system and method for tracking lost subjects using GPS triangulation techniques.

2. Description of Related Art

By way of background, children, adults with challenged mental capacity, and pet animals can easily wander off from their intended location either by disorientation, distraction, theft or kidnapping. Parents and guardians are concerned now more than ever with the increase of kidnappings and foul play on the part of children. Foul play can happen anywhere including the home, parks and forests, schools, public shopping malls, etc. Adults or persons with mental impairments such as Alzheimer's or other mentally challenged persons may not have the capacity to understand boundary limits and are at risk of wandering off without proper supervision. Cats and dogs may also be lost or stolen and cannot find their way back to their homes. With increasing concerns regarding theft, kidnapping, foul play or mental impairments, there is a need for a directional finder tracking system and alerting mechanism that incorporates a convenient transponder and receiver that is readily available, portable, convenient and easy to use.

The following art defines the present state of this field:

U.S. Pat. No. 5,914,675 to Tognazzini discloses a portable emergency locator device which includes a global positioning system (GPS) receiver generating location data and a wireless telephone transceiver for transmitting the location data as digital data to a called station during a two-way voice conversation via a wireless telephone network (cellular, PCS, or satellite). The emergency locator device can be implemented as a conventional wireless telephone having interfaces for receiving the location data from an external GPS receiver and vehicle status data from external vehicle control systems. The data received from the interfaces is stored in an internal memory for transmission to the called station in response to an emergency event trigger U.S. Pat. No. 6,014,080 to Layson, Jr discloses a tamper resistant body-worn tracking device to be worn by offenders or potential victims for use in a wireless communication system receiving signals from a global positioning system (GPS). The tracking device directly communicates spacial coordinates to multiple remote sites. The tracking device is an enclosed case worn on a limb of a person. The case contains a battery, a signaling device, and a circuit board containing a field programmable gate array, a wireless data modem, a conventional GPS receiver, and a matched filtering GPS receiver.

U.S. Pat. No. 6,339,397 to Baker discloses a portable self-contained tracking unit which includes an enclosure attached to a mounting plate, with a hollow interior cavity housing a GPS receiver, a microprocessor and a transmitter. The GPS receiver will receive tracking data and the microprocessor will process the tracking data into a data packet. The transmitter transmits the data packet to a remote receiving station, for transmission to a central database. Photoelectric cells are mounted on the enclosure to recharge batteries which provide power to the electrical components of the tracking unit. The enclosure is designed with a pair of vertically oriented side panels which are generally orthogonally oriented so that the solar panels mounted on the side panels will maintain a favorable solar incidence angle during a wide range of orientations. The transmitter is a cellular telephone with an antenna mounted within the enclosure but spaced a distance from the metal mounting plate and electrical components approximately one-quarter wavelength of the operating frequency of the transmitter. The enclosure is formed of a radio frequency and optically transparent material, so that the antenna and the solar panels may be housed within the hollow interior cavity of the enclosure. In the method of the invention, tracking data is periodically transmitted via cellular phone to a cellular service provider, thence to a data service bureau which sends the data over the Internet to the database of a central server computer. The central server computer will decode the information and provide an interface and value added products such as maps and reports for customers via a web page on the Internet.

U.S. Pat. No. 6,819,258 to Brown discloses a system for tracking a person from a system subscriber who affixes a location unit to the person to be tracked, wherein the location unit calculates the location of the person at any given time. The system includes a web host connected to a wide area web network, such as the Internet, the web host includes a computer readable medium and is accessible by the subscriber from a remote computer terminal. A computer program resides on the web host for receiving a tracking request from the subscriber and transmitting a tracking call to the location unit carried by the person. The computer program includes instructions embodied in computer readable code for automatically transmitting the tracking call, receiving location data from the location unit in response to the tracking call, and transmitting the location data to the subscriber's terminal where the current location of the person is displayed.

U.S. Patent Application Publication No. US2005/0017900 to Grimm discloses a tracking unit for assisting in the recovery of stolen monies or other property which includes a housing containing a GPS receiver for receiving GPS signals from overhead satellites, a cellular phone transceiver, a microprocessor, and a battery. Following a theft, the microprocessor activates the cellular phone transceiver to dial the telephone number of a central monitoring station. The microprocessor obtains location data from the GPS receiver and transmits the location data, along with identification information, to the central monitoring station. The tracking unit also includes a separate, conventional RF beacon transmitter for allowing authorities to home-in on the tracking unit within a large building or other structure, either after the GPS signals are lost, or after the location of the tracking unit is localized to a specific building or area.

U.S. Patent Application Publication No. US2005/0020274 to Ursini discloses a child locating device that is compact and portable. It has a multitude of stealth, placement, and deployment applications. It can be disguised on a child's wrist, as a bracelet, pendant, watch, ankle bracelet, pocket item, attatched to clothing, worn in hair, or in or on a shoe. The device is activated via internet and/or dialing software. The GPS software then tracks from many locations. Locations include home, office, car, or on foot. The system deploys and tracks from a variety of devices, laptop computer, personal computer, or a hand held computer. It combines hardware, GPS software, telephone line, cellular, and internet into a complete child locator.

U.S. Patent Application Publication No. US2006/0170588 to Chang discloses a tracking method for a cell phone with a positioning device and a system thereof. The longitudinal and latitudinal coordinates of a tracked end in a global positioning system (GPS) are sent to a cell phone of a tracking end via a short message service (SMS). After decoding the short message contents, the longitudinal and latitudinal coordinates are displayed in a geographic information system (GIS) installed in the cell phone.

U.S. Patent Application Publication No. US2006/0176216 to Hipskind discloses an apparatus and methods for tracking an object. The apparatus and methods provide for GPS tracking, and can include a communication system that transmits the position of the object to a central database. Software can track the object and provide updates as to the position, speed, course, and other items of interest.

U.S. Patent Application Publication No. US2006/0223518 to Haney discloses a system for exchanging GPS or other position data between wireless devices for purposes of group activities, child location monitoring, work group coordination, dispatching of employees etc. Cell phones and other wireless devices with GPS receivers have loaded therein a Buddy Watch application and a TalkControl application. The Buddy Watch application communicates with the GPS receiver and other wireless devices operated by buddies registered in the users phone as part of buddy groups or individually. GPS position data and historical GPS position data can be exchanged between cell phones of buddies and instant buddies such as tow truck drivers via a buddy watch server. Emergency monitoring services can be set up with notifications to programmable individuals in case an individual does not respond. Positions and tracks can be displayed. TalkControl simplifies and automates the process of joining talk groups for walkie talkie services such as that provided by Nextel.

U.S. Patent Application Publication No. US2007/0099626 to Lawrence et al. discloses a system and method for determining and communicating the precise location of an individual and/or a motor vehicle in real-time. As an example, a tracking system is disclosed that includes a Global Positioning System (GPS) receiver, a cellular phone, and a processing unit. The GPS receiver, cellular phone and processing unit are arranged as a single, compact tracking unit. The processing unit receives precise location information (e.g., latitudinal and longitudinal coordinates) for the tracking unit from the GPS receiver. A cellular phone capable of receiving text messages (e.g., and/or voice messages) can be used to call the cellular phone of the tracking unit, which responds (e.g., to an authenticated call) by transmitting a text message (e.g., or synthesized voice message) including the precise coordinates of the tracking unit. Thus, either with or without the knowledge of the individual carrying the tracking unit or driving the motor vehicle containing the tracking unit, the system is capable of providing the exact location of the individual and/ or motor vehicle to another at any point in time.

The prior art described above teaches various types of tracking devices, each of which providing a GPS receiver built into the tracking device itself. However, the prior art fails to teach a tracking system or method that utilizes triangulation between a GPS-equipped receiver, such as a cell phone or the like, a wearable transponder, and at least one satellite/ tower in order to locate the transponder based on, or relative to, the GPS coordinates of the receiver. Aspects of the present invention fulfill these needs and provide further related advantages as described in the following summary.

SUMMARY OF THE INVENTION

Aspects of the present invention teach certain benefits in construction and use which give rise to the exemplary advantages described below.

The present invention solves the above-described problems by providing a system and method for tracking lost subjects. In sum for a specific exemplary embodiment of the invention, a microprocessor or chip, herein referred to as a transponder, is embedded in an article such as a shoe, most likely during fabrication rather than "after market," though it will be appreciated that any means now or later developed by which such a transponder is placed on or in a shoe or other item is possible in the present invention. The transponder is configured for sending and receiving signals to a receiver, such as a cellular phone or other wireless communication device over a typical wireless network. In use, proprietary software is installed in the receiver that can then be used to synchronize the receiver with the transponder by keying in an appropriate transponder code. Then, when the location of the transponder, i.e., the article, and hence the wearer, is to be determined (as when a child is separated from his/her parents or has been abducted), the appropriate transponder code is once again input into the receiver, thereby sending out a signal to be received by the transponder, which would then send a reply message. Based on triangulation between the receiver, the transponder, and the satellite or broadcast tower, and knowing the location of the receiver based on its inherent GPS capabilities, the precise location of the transponder (distance and direction from the receiver) is thus determined, which information can then be displayed on the receiver as a text message or even reported audibly or sent to emergency responders or amber alert broadcasters. Other features of the transponder may include an internal battery source, which alone may outlast the shoes or other item due to the battery conservation of the transponder by not being fully powered unless a message is received or transmitted, more about which is explained further below.

A primary objective inherent in the above described system and method of use is to provide advantages not taught by the prior art.

Another objective is to provide such a system that utilizes triangulation between a GPS-equipped receiver, such as a cell phone or the like, a wearable transponder, and at least one satellite/tower in order to locate the transponder based on, or relative to, the GPS coordinates of the receiver.

A further objective is to provide such a system that does not require the transponder itself to have GPS capabilities, thereby reducing its size, power requirements, and expense.

A still further objective is to provide such a system that is compatible with a wide range of pre-existing cell phones and similar receivers.

A still further objective is to provide such a system that allows a single receiver to monitor and track multiple transponders.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawing illustrates aspects of the present invention. In such drawing:

DETAILED DESCRIPTION OF THE INVENTION

Figure 1:
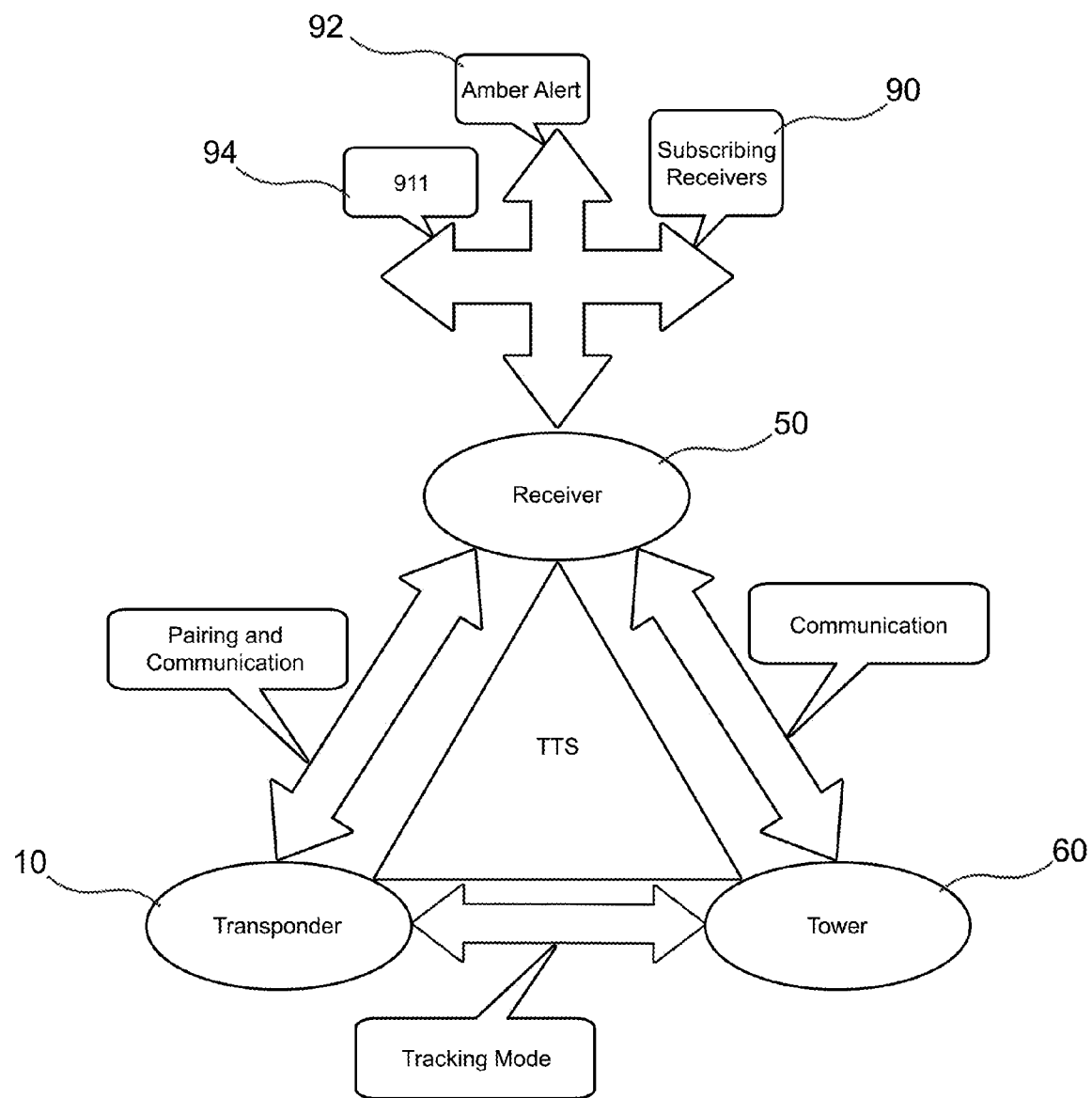
FIG. 1 is a schematic diagram of an exemplary embodiment of the invention.

The above described drawing FIGURE illustrate aspects of the invention in at least one of its exemplary embodiments, which are further defined in detail in the following description.

In more detail regarding the exemplary embodiment of the present invention, then, with reference to FIG. 1, there is disclosed a system and method for monitoring and tracking the position of a subject, such as a child, pet or other item of value. The system preferably comprises a transponder 10 and a GPS-enabled receiver 50.

In the exemplary embodiment, the transponder 10 is embedded within an article (not shown) that is configured to be worn by the subject. Where the subject is a child, the article may be such items as shoes, clips, pins, buttons, chains, pants, shirts, etc. Where the subject is a pet, the article may be a collar or any other type of pet accessory. Thus, the article itself may be any conceivable item, now known or later developed, that is wearable by a person or pet, so long as the article allows for the transponder 10 to be embedded therein or securely affixed thereto. In an alternate embodiment, the transponder 10 is affixed directly to the subject.

The GPS-enabled receiver 50 is preferably a cellular phone, to be maintained by a user (not shown), such as a parent, babysitter or other guardian. In alternate embodiments, the receiver 50 may be a PDA, personal computer, or any other electronic device, now known or later developed, having GPS capabilities. After installing the necessary software onto the receiver 50, the receiver 50 is synchronized with the transponder 10 and configured for monitoring and tracking the location of the transponder 10, and thus the subject, as further discussed below.

In the exemplary embodiment, the receiver 50 is incorporated with cellular phone technology, which enables the user, among other things, to program a specific and unique transponder code, allowing the receiver 50 to synchronize and communicate with that particular transponder 10. Alternatively, during a pairing sequence or routine, the receiver 50 automatically acquires and stores the unique transponder code associated with each transponder 10 to which the receiver 50 is to be synchronized.

With the receiver 50 and transponder 10 synchronized, the user can effectively remotely activate the system, as when the subject cannot be located or the user is merely curious as to the subject's current whereabouts, by inputting the unique transponder code into the synchronized receiver 50. The receiver 50 then sends out a signal to be received by the transponder 10, which then sends a reply message back to the receiver 50. Alternatively, the receiver 50 is able to automatically monitor and track the subject when the transponder 10 exceeds a prescribed perimeter boundary option if desired. In such a situation, the receiver 50 warns its holder, i.e., the user, of the safe distance compromise, digitally determines distance in feet or meters, and utilizes a directional finder arrow to guide the user in the direction of the transponder 10, much like a compass. The receiver 50 is able to display or audibly announce the distance away and direction of the transponder 10 and triangulate to a cell quadrant like GPS. Once within that quadrant, the receiver 50 may give more specific signalization utilizing, but not limited to, the compass arrow and distance described above. The receiver 50 can also optionally activate a network tracking sequence by sending the transponder code associated with the lost or "out of bounds" transponder 10 to other "subscribing" receivers 90, as by a text message or the like.

The receiver 50 is also preferably capable of storing, in the receiver's 50 pre-existing memory, vital information regarding the subject, as associated with the respective transponder code, including but not limited to the subject's physical features, a digital picture, the age, weight, sex, color, clothing last worn, shoe type, model size, and any other uniquely defining characteristics of the subject. Thus, it will be appreciated that the receiver 50 will not only be able to be used as a tracking device but will incorporate technology to wirelessly or otherwise communicate, via Bluetooth® or other wireless communication protocol now known or later developed, the same information and tracking code from the host receiver 50 to other subscribing receivers 90, thus creating a unique mechanism for multi-tracking capabilities of the pertinent transponder 10. That is, the quick transmittal of pertinent information to other receivers 90, as in the exemplary embodiment, enables the notification of numerous people at one time other than by sending them all emails (or in addition to). For instance, if a child is lost at an amusement park, the user can click and broadcast an alert to numerous receivers 90 from the host receiver 50, even those that the user doesn't know, without the long arduous task of emailing the information. Other mediums of mass communication, now known or later developed, may be used as well, including social networking websites such as Myspace, Facebook and Twitter.

With law enforcement intervention and in coordination with cellular phone services or networks or the like, an "amber alert" message 92 or other emergency "911" message 94, as illustrated in FIG. 1, can be broadcast through wave, cellular or other band to a prescribed local, regional, county, state or other level, thereby alerting the appropriate authorities or other subscribing receivers 90 of a missing person or other emergency. Upon acceptance of the warning by the user, the pre-stored vital information and unique transponder code of the transponder 10 can be broadcast back to the subscribing receivers 90 on the cellular or other network for further action as necessary. In order to ensure that the present system does not become a nuisance or is not overloaded, only the subscribing receivers 90 within the prescribed area, or more specifically within the transponder 10 range capabilities, may become activated. With this "posse" feature, then, if a child is lost in Los Angeles, for example, and the parents or other family and friends think the abductor may live in Fresno and heading there, one can mass signal those people in the Fresno area and they can opt in or not to see if the child's coordinates as determined through triangulation are within their locale. In an alternative embodiment, such "opt in" of third-party subscribing receivers 90 can be accomplished more universally at the time of subscription or activation rather than in response to a particular notification. In either case, this "amber alert" opt in could allow for hundreds of "posse" advocates on the lookout for the lost child. Furthermore, it would enable transmission of the pertinent information to the local police department(s), FBI, or other authorities.

Again, the transponder 10 can take the shape of, or be incorporated on or in, many convenient forms, including but not limited to straps, clips, pins, wrist bands, necklaces, chains and clothing units such as shoes, so as to be comfortably and discretely worn by the subject. By way of further illustration of aspects of the invention, electronic fabrics can be employed and sewn into military uniforms, helmets, or the like for tracking, wherein the triangulation method and related system of the present invention can also be employed for troop accountability and field monitoring of a brigade. This will allow a central command to see where all the troop personnel are located in a geographic area for strike force maneuvering, etc. Thus, in an exemplary embodiment, any such clothing units would include electronic built-in transponders 10 that when programmed would indicate the location of the subject. In the case of shoes, specifically, the transponders 10 may be placed into the soles and will have a life that is equal to or greater than the "wearable" life of typical shoes. Because such self-contained battery transponders 10 are only to be activated when signaled by the receiver 50 in order to generate a unique code path, as explained further below, it will be appreciated that energy or power consumption is minimized and hence battery life is greatly extended, thus enabling the transponder 10 as a whole to outlast the shoe or other item in or on which the transponder 10 is installed. The passive hardware of the transponder 10, then, essentially consists of a relatively small microprocessor, a transceiver, a memory device separate from or incorporated within the microprocessor for storage of a small amount of identification data, particularly the transponder code through which it is synchronized with the receiver 50, and a battery as explained above. It is also noted that in the event that a child or transponder 10 is found dead or decomposed some time later and the body is unidentifiable, one can look at the "tracking" shoe whereby the police can locate the receiver 50 and thus identifying next of kin. The invention would thus have application with lost or feared dead persons, as effectively the shoe and hence transponder 10 would be the last to be decomposed.

With continued reference to FIG. 1, there is again shown an overall schematic of the system and method for tracking lost subjects of the present invention and particularly of the "triangulation" method employed in the exemplary embodiment. Based on triangulation between the receiver 50, the transponder 10, and the nearest satellite or broadcast tower relative to the receiver's 50 geographic location, more generally denoted the network broadcast site 60, and knowing the location of the receiver 50 based on its inherent GPS capabilities, the precise location of the transponder 10 (distance and direction from the receiver 50) is thus determined.

As a threshold matter, it is noted that "triangulation" as that term is used herein describes the general method as summarized above whereby knowledge of two fixed points in space (the locations of the GPS-equipped receiver 50 and the network broadcast site 60) and of the angular position of the transponder 10 relative to the network broadcast site 60, the precise spatial location (coordinates) of the transponder 10 relative to the receiver 50 can thus be determined—that is, with information effectively about two sides and an included angle, the rest of the data about the triangle comprising three sides and three vertices or corners can be geometrically determined, including the spatial location of the third vertex (representing the transponder 10). As such, it is to be understood by those skilled in the art that "triangulation" as that term is used herein expressly does not include "geodetic triangulation," which as a discipline or technique of geodesy, the branch of geology that studies the shape of the earth and the determination of the exact position of geographical points and so is concerned with topographical surveying or mapping, was actually a precursor to and in large part has been replaced by GPS techniques for geodesy.

Specifically, geodetic triangulation is a technique by which physical datums or markers on the earth's surface serve as fixed reference points from which angular measurements can be made to then fix or determine other points, as is well known in the art of surveying on a smaller scale. As such, of late, GPS capabilities for determining physical locations based on satellite data have begun to render traditional geodetic triangulation obsolete. By comparison, again, the "triangulation" method of the present invention is not rendered obsolete by the present invention, but instead employs the GPS capabilities of cell phones or the like to fix a first reference point from which, in conjunction with the satellite or broadcast tower as the second reference point, the third reference point of the transponder, and thus the location of the missing person, pet or thing, is then determined geometrically. As will be appreciated, by taking advantage of the GPS capabilities of a cell phone or the like and configuring such a phone with the necessary software for activating and synchronizing with a transponder and then for "on demand" tracking by calculating the location of the transponder relative to the cell phone, there is disclosed herein a system and method by which current GPS capabilities can be taken advantage of without the cost, size and power requirements of a GPS transceiver in the transponder 10, or being worn on the person, pet or thing being tracked. Thus, it will be further appreciated that the system and method of the present invention is more conducive to widespread commercialization.

To summarize, regarding the exemplary system and method for tracking lost subjects of the present invention, as employed in connection with a transponder-receiver set, it will be appreciated that such a transponder 10 is provided for installation on or in a clothing article such as a shoe and configured to work in conjunction with a GPS-enabled receiver 50, such as a cell phone or the like, to track and determine the location of the transponder 10, and thus the person or missing pet or other item. The receiver 50 is thus able to determine its precise coordinates as by GPS capabilities or the like and, in conjunction with software residing in the receiver 50 and the relay of signals with the transponder 10 through a network broadcast site 60, is thus able to determine the location of the transponder 10 without having to separately equip the transponder 10 with a GPS transceiver or the like. Thus, the present system and method is able to take numerous forms in conveniently and effectively determining the location of a subject without departing from the spirit and scope of the invention.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A method for monitoring and tracking the position of a subject, the method comprising:
    embedding a transponder into an article to be worn by the subject;
    installing software in a GPS-enabled receiver for synchronizing and communicating with the transponder, the receiver to be maintained by a user;
    storing a unique transponder code in the receiver;
    synchronizing the transponder with the receiver based on the unique transponder code;
    selectively activating the transponder remotely;
    triangulating the geographic position of the transponder by:

fixing a first reference point based on the location of the GPS-enabled receiver;

fixing a second reference point based on the location of a network broadcast site through which the receiver and transponder communicate; and calculating the location of the transponder based on the angular position of the transponder relative to the network broadcast site; and determining distance and direction of the transponder from the receiver in order to guide the user in the direction of the transponder.

2. The method of claim 1, further comprising the step of storing information regarding the subject in the transponder.

3. The method of claim 2 wherein the stored information is selected from the group consisting of physical features, a digital picture, age, weight, sex, color, clothing last worn, shoe type, and model size.

4. The method of claim 1, wherein the receiver is a cellular phone.

5. The method of claim 1, wherein the network broadcast site is one of a satellite or broadcast tower.

6. The method of claim 1, wherein the step of storing a unique transponder code in the receiver comprises the further step of manually inputting the transponder code into the receiver.

7. The method of claim 1, wherein the step of storing a unique transponder code in the receiver comprises the further step of automatically acquiring the transponder code from the transponder.

8. The method of claim 1, wherein the step of remotely activating the transponder further comprises the step of inputting the transponder code into the receiver.

9. The method of claim 1, wherein the step of remotely activating the transponder further comprises the steps of:

inputting a prescribed perimeter boundary into the receiver as a maximum allowable distance of the transponder from the receiver; and automatically activating the transponder when the transponder exceeds the prescribed perimeter boundary.

10. The method of claim 9, wherein the step of automatically activating the transponder further comprises the steps of:

comparing the distance of the transponder from the receiver against the perimeter boundary; and notifying the user appropriately if the transponder exceeds the prescribed perimeter boundary.

11. The method of claim 1, further comprising the step of selectively activating a network tracking sequence by sending the transponder code to other subscribing receivers.

12. The method of claim 11, wherein the transponder code is only sent to the subscribing receivers within a defined geographic range.

13. A method for monitoring and tracking the position of a subject, the method comprising:

embedding a transponder into an article to be worn by the subject;

installing software in a GPS-enabled host receiver for synchronizing and communicating with the transponder, the host receiver to be maintained by a user;

synchronizing the transponder with the host receiver based on a unique transponder code;

selectively activating the transponder remotely;

triangulating the geographic position of the transponder by:

fixing a first reference point based on the location of the GPS-enabled receiver;

fixing a second reference point based on the location of a network broadcast site through which the receiver and transponder communicate; and calculating the location of the transponder based on the angular position of the transponder relative to the network broadcast site;

determining distance and direction of the transponder from the host receiver in order to guide the user in the direction of the transponder; and selectively activating a network tracking sequence by sending the transponder code to other subscribing receivers.

14. The method of claim 13, wherein the step of selectively activating the network tracking sequence further comprises the step of opting into the network tracking sequence by the other subscribing receivers.

15. The method of claim 14, wherein the step of opting into the network tracking sequence occurs once at the time of software installation.

16. The method of claim 14, wherein the step of opting into the network tracking sequence occurs each time the network tracking sequence is activated.

* * * * *